US012622351B1

(12) United States Patent
Lancaster

(10) Patent No.: US 12,622,351 B1
(45) Date of Patent: May 12, 2026

(54) LAWN MOWER BLADE ASSEMBLY WITH REPLACEABLE CUTTERS

(71) Applicant: Wilburn B. Lancaster, Woodland, MS (US)

(72) Inventor: Wilburn B. Lancaster, Woodland, MS (US)

( * ) Notice: Subject to any disclaimer, the term of this patent is extended or adjusted under 35 U.S.C. 154(b) by 0 days.

(21) Appl. No.: 19/332,223

(22) Filed: Sep. 18, 2025

(51) Int. Cl.
*A01D 34/73* (2006.01)
*A01D 101/00* (2006.01)

(52) U.S. Cl.
CPC ........... *A01D 34/733* (2013.01); *A01D 34/73* (2013.01); *A01D 2101/00* (2013.01)

(58) Field of Classification Search
CPC .............................. A01D 34/73; A01D 34/733
See application file for complete search history.

(56) References Cited

U.S. PATENT DOCUMENTS

| | | | | |
|---|---|---|---|---|
| 2,786,322 A | * | 3/1957 | Mcevers | A01D 34/73 |
| | | | | 30/276 |
| 3,321,894 A | * | 5/1967 | Ingram | A01D 34/63 |
| | | | | 56/295 |
| 3,327,460 A | * | 6/1967 | Blackstone | A01D 34/73 |
| | | | | 56/295 |
| 3,596,453 A | * | 8/1971 | Smith | A01D 34/733 |
| | | | | 56/255 |
| 3,762,138 A | * | 10/1973 | Michael | A01D 34/733 |
| | | | | 56/295 |
| 3,769,784 A | * | 11/1973 | Jones | A01D 34/73 |
| | | | | 56/295 |

| | | | | |
|---|---|---|---|---|
| 4,283,905 A | | 8/1981 | Van der Lely | |
| 4,611,460 A | * | 9/1986 | Parker | A01D 34/73 |
| | | | | 56/295 |
| 4,715,173 A | * | 12/1987 | Anderson | A01D 34/733 |
| | | | | 56/DIG. 9 |
| 4,922,698 A | * | 5/1990 | Taylor | A01D 34/733 |
| | | | | 56/295 |

(Continued)

FOREIGN PATENT DOCUMENTS

| | | |
|---|---|---|
| CN | 215683387 U | 2/2022 |
| CN | 116897679 A | 10/2023 |

(Continued)

OTHER PUBLICATIONS

DE_29908940_U1_I_-_English_translation (Year: 1999).*

*Primary Examiner* — Joseph M Rocca
*Assistant Examiner* — Julia C Tran
(74) *Attorney, Agent, or Firm* — HULSEY P.C.

(57) ABSTRACT lawn mower blade assembly including a blade having an elongated section, and extending plates, each extending plate extending from the elongated section. Each of the extending plates includes connecting holes. The lawn mower blade assembly includes a plurality of cutters, each cutter having an interfacing section with cutter connecting holes configured to align with the connecting holes. Each cutter includes a cutter raised section extending from the interfacing section and has a cutter cutting edge. The cutters are removably attachable to the extending plates using fasteners that pass through the cutter connecting holes and the connecting holes. The blade assembly allows individual cutters to be removed and replaced without removing the entire blade assembly from the lawn mower spindle shaft.

9 Claims, 7 Drawing Sheets

(56) References Cited

U.S. PATENT DOCUMENTS

| | | | | |
|---|---|---|---|---|
| 5,303,535 A * | 4/1994 | Smith | A01D 34/733 | 56/DIG. 17 |
| 5,467,586 A * | 11/1995 | Lin | A01D 34/73 | 56/DIG. 20 |
| 5,839,263 A * | 11/1998 | Biernath | A01D 34/73 | 56/DIG. 17 |
| 6,182,430 B1 * | 2/2001 | Blarek | A01D 34/73 | 56/DIG. 17 |
| 6,935,095 B1 * | 8/2005 | Sluder | A01D 34/733 | 56/DIG. 17 |
| 2005/0210852 A1 * | 9/2005 | Lancaster | A01D 34/73 | 56/295 |
| 2006/0168933 A1 * | 8/2006 | Hill | A01D 34/73 | 56/295 |
| 2008/0209881 A1 | 9/2008 | Bauer | | |
| 2010/0257832 A1 * | 10/2010 | Smith | A01D 34/733 | 56/295 |
| 2012/0110970 A1 * | 5/2012 | Blarek | A01D 34/73 | 56/295 |
| 2012/0279032 A1 * | 11/2012 | Janikowski | A01D 34/733 | 29/275 |
| 2015/0359171 A1 * | 12/2015 | Butler | A01D 34/005 | 56/295 |
| 2022/0183226 A1 | 6/2022 | Andriolo | | |
| 2022/0183228 A1 * | 6/2022 | Payne | A01D 34/733 | |
| 2022/0369548 A1 * | 11/2022 | Cheetham | A01D 34/733 | |
| 2024/0172587 A1 | 5/2024 | Zeiler et al. | | |
| 2025/0107483 A1 | 4/2025 | Tong | | |

FOREIGN PATENT DOCUMENTS

| | | | | |
|---|---|---|---|---|
| CN | 113475217 B | 5/2025 | | |
| DE | 29908940 U1 * | 8/1999 | | A01D 34/73 |
| DE | 202023107015 U1 | 1/2024 | | |
| EP | 3120682 B1 | 2/2018 | | |
| JP | 5995766 B2 | 9/2016 | | |

* cited by examiner

LAWN MOWER BLADE ASSEMBLY WITH REPLACEABLE CUTTERS

BACKGROUND OF THE INVENTION

Field of the Invention

The present disclosure relates to lawn mower blade assemblies, and more particularly to a lawn mower blade assembly with replaceable cutters that can be maintained without removing the entire blade assembly from the mower.

Description of the Prior Art

Lawn mowers are widely used for maintaining grass and vegetation in residential, commercial, and industrial settings. These machines typically employ rotating cutting blades mounted beneath a deck housing to trim grass to a desired height. The cutting blades are subject to regular wear and dulling through contact with grass, soil, rocks, and other debris during operation.

Traditional lawn mower blade maintenance involves removing the entire blade assembly from the mower for sharpening or replacement. This process typically requires users to tilt the mower or access the underside of the deck, disconnect the blade from the spindle shaft, and transport the blade to a sharpening facility or replace it entirely. Users often find themselves lying on the ground, lifting heavy equipment, or maneuvering the mower onto ramps or other support structures to gain access to the blade assembly.

The conventional approach to blade maintenance presents several challenges. Users may experience physical strain from lifting and positioning equipment, potential safety concerns from working beneath machinery, and inconvenience from the time and effort involved in blade removal and reinstallation. Additionally, when blades become dull, the entire blade assembly is often discarded and replaced, even though only the cutting edges may be worn while the remainder of the blade structure remains functional.

The frequency of blade maintenance varies depending on usage conditions, but regular attention to blade sharpness contributes to optimal cutting performance and engine efficiency. Dull blades can result in poor cutting quality, increased fuel consumption, and potential damage to grass through tearing rather than clean cutting. Current maintenance practices may discourage users from maintaining optimal blade sharpness due to the associated inconvenience and physical demands.

Various lawn mower configurations exist in the market, including push mowers, self-propelled units, and riding mowers with different deck sizes and blade arrangements. Some mowers utilize single blade systems while others employ multiple blades. Different blade types are available for specific cutting applications, such as standard cutting, mulching, and various lift configurations for different grass conditions.

An example is disclosed in a Japanese Patent No. 5995766, entitled "Moore" ("the '766 Patent"). The '766 Patent discloses a mower capable of more simply grinding a cutter blade. The mower includes a mower deck, a cutter blade that is provided inside the mower deck and rotativity driven around a vertically-directed shaft center; an opening that is formed in the mower deck and from which a grinding tool for grinding the cutter blade is taken into the mower deck; and a lid member that can switch the opening between opened and closed states.

Another example is disclosed in a U.S. Publication No. 20250107483, entitled "Type of grass trimmer and method of using the same" ("the '483 Publication"). The '483 Publication discloses a grass trimmer comprising a machine head including at least one electric motor, a grass trimmer head driven by the electric motor, and a housing for containing the electric motor. And a base including a shell. In addition, there is a trimming wheel device and a tank wheel device which assist in moving the grass trimmer head. The tank wheel device and the trimming wheel device form a detachable connection to the base. When trimming is required, the base connects to the trimming wheel device. When mowing is required, the tank wheel device replaces the connection between the trimming wheel device and the base.

Although the above discussed disclosures are useful, they still have problems and present incomplete solutions. The conventional blade replacement process requires users to physically tilt the entire lawn mower to access the underside of the deck, which may involve significant physical strain and potential injury risk. Users must position themselves beneath or alongside the tilted equipment to reach the blade assembly, often requiring them to lie on the ground or assume uncomfortable positions that may contribute to back strain and other physical discomfort.

The blade removal process involves disconnecting the blade and associated washers from the spindle shaft, which requires users to place their hands in proximity to the blade path area. This positioning may present safety concerns, particularly when working with sharp blade edges or when the blade assembly is not properly secured during the removal process.

When installing replacement blades, users must ensure proper orientation of the cutting edges relative to the rotation direction of the spindle. Incorrect installation may result in reduced cutting performance or potential damage to the mower mechanism. The maintenance process may involve transporting blades to sharpening facilities, which consumes time and may result in periods when the mower is not operational. Some users may choose to discard entire blade assemblies rather than pursue sharpening services, contributing to waste generation even when only the cutting edges require attention while the structural components remain functional.

Delayed blade maintenance due to the inconvenience of the replacement process may result in continued operation with dull cutting edges. Dull blades may tear grass rather than providing clean cuts, potentially damaging lawn appearance and grass health. The reduced cutting efficiency may also increase fuel consumption and place additional strain on the mower engine during operation.

Therefore, there is a need in the art to provide an improved blade assembly that enables simplified maintenance and replacement of cutters connecting a blade without requiring removal of the entire blade assembly or tilting of the mower equipment.

SUMMARY OF THE INVENTION

It is an object of the present invention to provide a lawn mower blade assembly that enables simplified maintenance and replacement of cutters without requiring removal of the entire blade assembly from the mower or tilting of the equipment, eliminating the physical strain and safety concerns associated with conventional blade maintenance procedures while allowing users to service cutting components while the mower remains in a stable position supported by its wheels.

It is another object of the present invention to provide a lawn mower blade assembly with replaceable cutters that can be individually serviced for sharpening or replacement while the primary blade remains attached to the spindle shaft, reducing maintenance complexity and time requirements while improving user safety through elimination of equipment tilting and awkward positioning requirements during service procedures.

It is another object of the present invention to provide a lawn mower blade assembly with dual cutting systems that enhance grass cutting performance through coordinated operation of multiple cutting elements positioned at different heights, with replaceable cutters positioned above extending plates to create elevated cutting configurations that provide comprehensive grass cutting coverage across the width of the mowing path.

It is another object of the present invention to provide a lawn mower blade assembly with standardized attachment systems using common fasteners that allow cutters to be serviced using standard tools, reducing specialized equipment requirements while enabling repeated assembly and disassembly cycles during maintenance procedures, and allowing cutters to be sharpened and reused multiple times to extend operational life and reduce replacement costs.

In order to achieve one or more objectives, the present invention provides a lawn mower blade assembly comprising a blade having an elongated section with extending plates that extend from the elongated section, wherein each extending plate comprises connecting holes for attachment of replaceable cutting components. The lawn mower blade assembly includes a plurality of cutters, each cutter comprising an interfacing section having cutter connecting holes configured to align with the connecting holes, and a cutter raised section extending from the interfacing section and comprising a cutter cutting edge. The cutters are removably attachable to the extending plates using fasteners that pass through the cutter connecting holes and the connecting holes, enabling individual cutter maintenance without complete blade assembly removal.

In one advantageous feature of the present invention, the lawn mower blade assembly provides simplified maintenance capabilities through replaceable cutters that can be individually serviced without requiring removal of the entire blade assembly from the spindle shaft, enabling users to perform cutting component maintenance while the mower remains in a stable position supported by its wheels and eliminating the physical strain and safety concerns associated with conventional blade replacement procedures that require equipment tilting and awkward user positioning.

In another advantageous feature of the present invention, the lawn mower blade assembly enhances grass cutting performance through dual cutting systems that coordinate operation of multiple cutting elements positioned at different heights. The replaceable cutters positioned above extending plates create elevated cutting configurations that provide comprehensive grass cutting coverage across the width of the mowing path, while the standardized attachment systems using common fasteners allow cutters to be serviced using standard tools and enable repeated assembly and disassembly cycles during maintenance procedures, allowing cutters to be sharpened and reused multiple times to extend operational life and reduce replacement costs.

These and other objects of the present invention will be apparent from review of the following specification and the accompanying drawings.

DETAILED DESCRIPTION OF THE PREFERRED EMBODIMENT

The detailed description set forth below in connection with the appended drawings is intended as a description of exemplary embodiments in which the presently disclosed invention may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed lawn mower blade assembly. However, it will be apparent to those skilled in the art that the presently disclosed invention may be practiced without these specific details. In some instances, well-known structures and devices are shown in functional or conceptual diagram form in order to avoid obscuring the concepts of the presently disclosed lawn mower blade assembly.

In the present specification, an embodiment showing a singular component should not be considered limiting. Rather, the invention preferably encompasses other embodiments including a plurality of the same component, and vice-versa, unless explicitly stated otherwise herein. Moreover, the applicant does not intend for any term in the specification to be ascribed an uncommon or special meaning unless explicitly set forth as such. Further, the present invention encompasses present and future known equivalents to the known components referred to herein by way of illustration.

Although the present invention describes lawn mower blade assembly, it is to be further understood that numerous changes may arise in the details of the embodiments of the lawn mower blade assembly. It is contemplated that all such changes and additional embodiments are within the spirit and true scope of this invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the invention and are not intended to limit the scope of the invention.

Various features and embodiments of a multifunctional lawn mower blade assembly are explained in conjunction with the description of FIGUREs (FIGS. 1-9.

Figure 1:
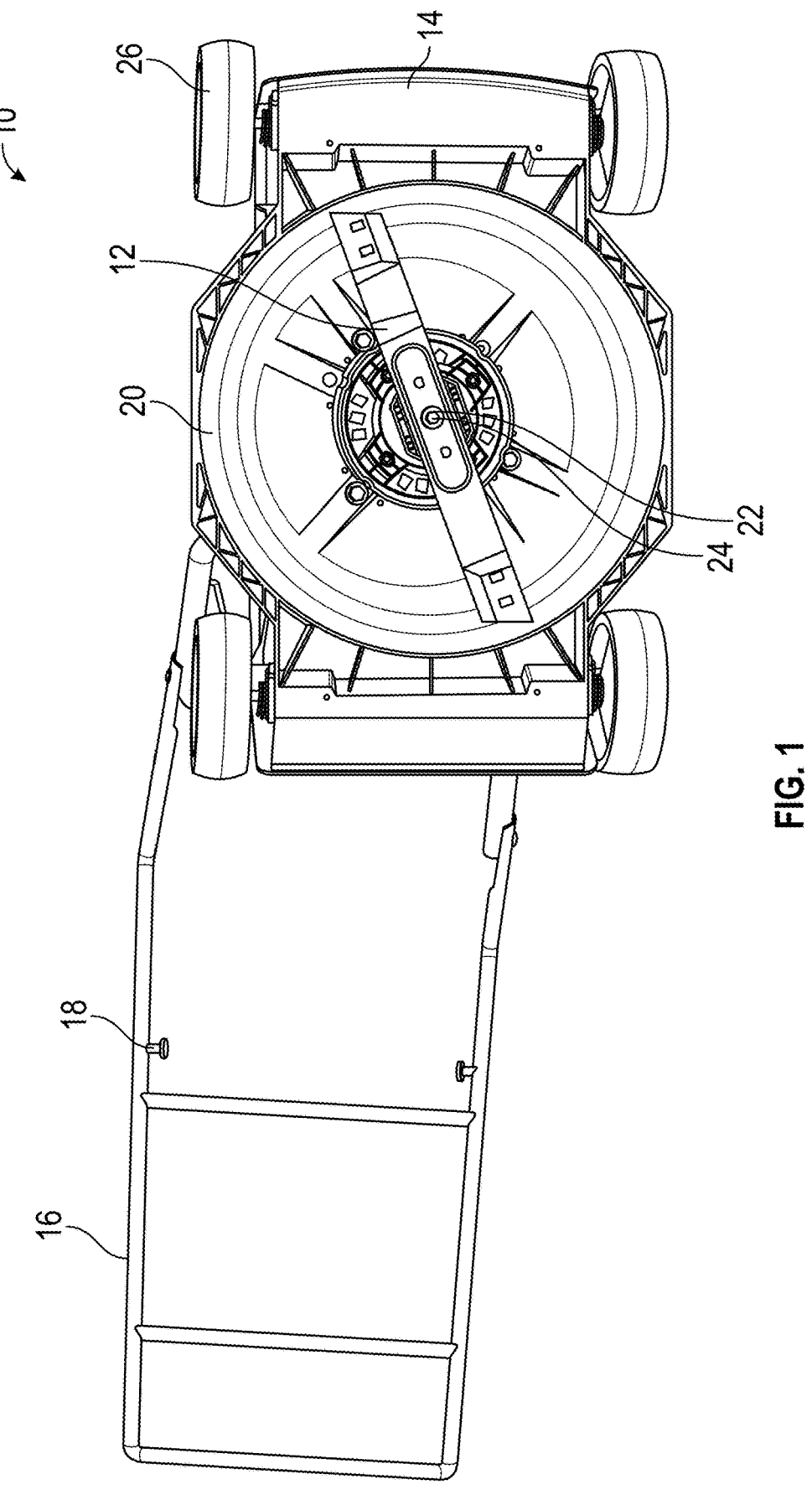
FIG. 1 illustrates a bottom perspective view of a lawn mower with a blade assembly, in accordance with one exemplary embodiment of the present invention.

FIG. 1 shows a lawn mower 10 incorporating a blade assembly 12 for performing grass cutting operations, in accordance with one exemplary embodiment of the present invention. As used herein, the term "lawn mower" may refer to a powered grass cutting machine designed to trim grass and vegetation to a desired height through the use of rotating cutting elements. Lawn mower 10 may be configured as a walk-behind unit, self-propelled mower, or riding mower depending on the specific application requirements and operational environment. Lawn mower 10 may be specifically engineered to address situations where conventional blade maintenance requires complete blade removal and equipment tilting, which can present physical strain and safety concerns for users. The term lawn mower encompasses machines that may be constructed from durable materials and designed for repeated use in residential, commercial, and industrial grass cutting applications. The lawn mower may incorporate ergonomic features and operational controls to facilitate precise cutting performance during grass maintenance procedures performed by users.

Lawn mower 10 includes a housing 14 that encompasses the main structural components and provides protection for internal mechanisms including engine systems and drive components. Housing 14 may be constructed from durable materials such as steel or aluminum alloy that provide structural integrity while maintaining appropriate weight distribution for user maneuverability. Lawn mower 10 includes a handle 16 extending from housing 14. Handle 16 allows user control and maneuvering of lawn mower 10 during operation. Handle 16 incorporates a throttle 18 that enables the user to control operational parameters of lawn mower 10, including engine speed and cutting performance, allowing for adjustment based on grass conditions and cutting requirements.

Lawn mower 10 further includes a mower deck 20 that forms the cutting chamber where grass cutting operations occur and provides containment for the rotating blade assembly 12 during operation. Lawn mower 10 includes a spindle shaft 22 extending through mower deck 20. Spindle shaft 22 provides the rotational drive mechanism for the cutting components, transferring power from an engine system to blade assembly 12. Spindle shaft 22 connects to blade assembly 12 through a blade bolt 24 that secures the blade assembly 12 in proper operational position and provides rotational coupling between the drive system and cutting elements. Blade bolt 24 provides both mechanical attachment and rotational coupling between spindle shaft 22 and blade assembly 12, ensuring secure connection during high-speed rotation while allowing for assembly removal when necessary for maintenance procedures. Spindle shaft 22 and blade bolt 24 arrangement allows blade assembly 12 to receive rotational power from the engine system for grass cutting operations.

Lawn mower 10 further includes wheels 26 connected to housing 14. Wheels 26 provide mobility and support for lawn mower 10 during operation and transport across various terrain conditions. Wheels 26 allow lawn mower 10 to be maneuvered while maintaining proper cutting height and stability, with wheel positioning designed to distribute weight evenly and prevent scalping or uneven cutting patterns. Housing 14 encompasses wheels 26 in a configuration that provides structural support and protects the wheel assemblies from debris and impact during operation.

Figure 2:
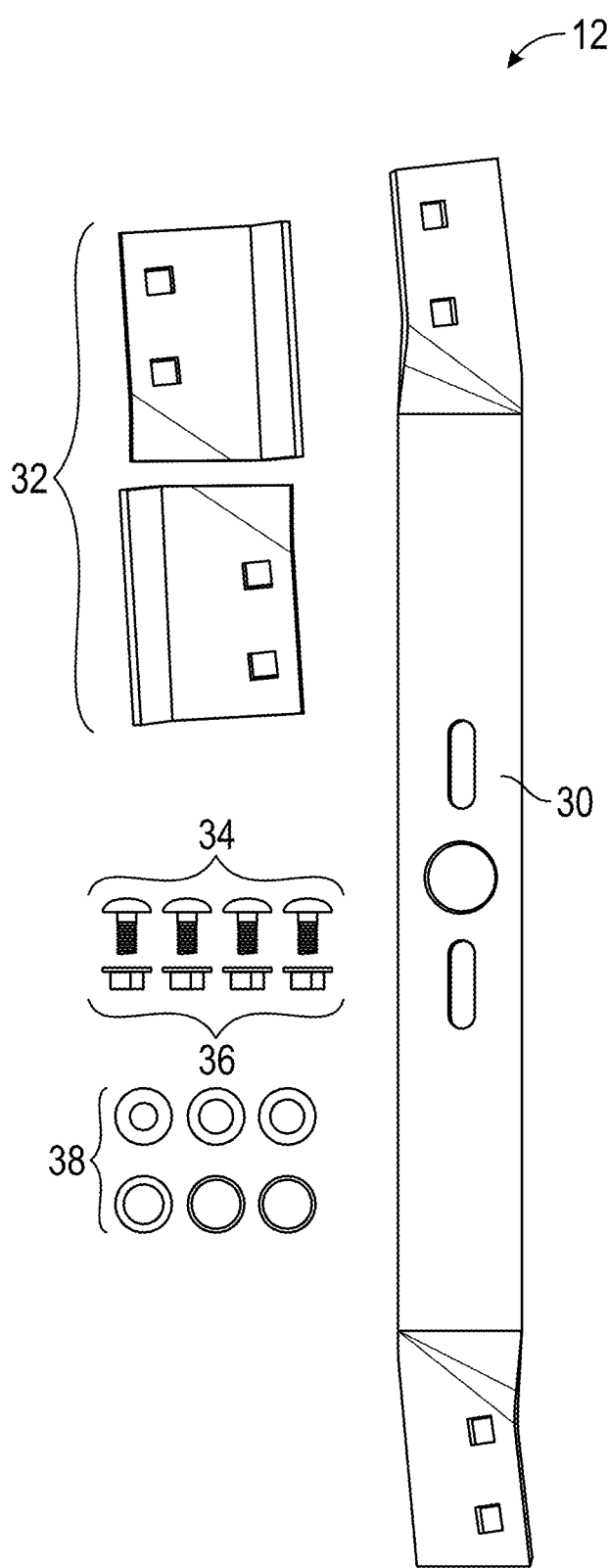
FIG. 2 illustrates components of the blade assembly of FIG. 1, in accordance with one embodiment of the present invention.

FIG. 2 shows components of blade assembly 12 spread-out, in accordance with one exemplary embodiment of the present invention. Blade assembly 12 includes a blade 30. Blade 30 may be configured in a relatively rectangular configuration that provides structural support and mounting surfaces for the cutting components. Blade 30 connects to spindle shaft 22 via blade bolt 24, establishing the mechanical coupling necessary for rotational power transfer from the engine system to the cutting assembly. The rectangular configuration of blade 30 may provide balanced weight distribution during high-speed rotation, contributing to stable operation and reduced vibration during grass cutting procedures. Blade 30 functions by spinning at high speeds to cut grass through rotational motion. The design of blade 30 may create airflow patterns that lift grass blades before cutting, positioning the vegetation for optimal cutting performance. This airflow generation may be achieved through the blade geometry and rotational speed, which creates suction that draws grass upward into the cutting path. Blade 30 is constructed from durable metal materials such as steel or aluminum alloy that provide structural integrity while maintaining appropriate weight distribution for balanced rotation during operation.

Blade assembly 12 further includes a pair of cutters 32 configured to cut grass in addition to blade 30. In accordance with the present embodiment, cutters 32 can be removed and replaced independently of blade 30. Cutters 32 are configured to attach to blade 30 through mechanical fastening using a plurality of fasteners 34 and a plurality of bolts 36. systems that allow for removal and replacement without requiring complete blade assembly 12 removal from lawn mower 10. Bolts 36 are configured with appropriate thread patterns and lengths to ensure proper engagement and clamping force for secure cutter attachment during high-speed rotation.

As further shown in FIG. 2, blade assembly 12 includes a plurality of washers 38 that provide proper load distribution and spacing between components during assembly. Washers 38 function as sizing washers that enable blade 30 to fit different spindle designs. Washers 38 are constructed from durable materials such as steel or brass and may be provided in multiple thicknesses to accommodate different spindle shaft 22 configurations and mounting requirements. In addition, washers 38 are used to connect fasteners 34 and bolts 36 to couple blade 30 and cutters 32.

Figures 3A, 3B, 3C:
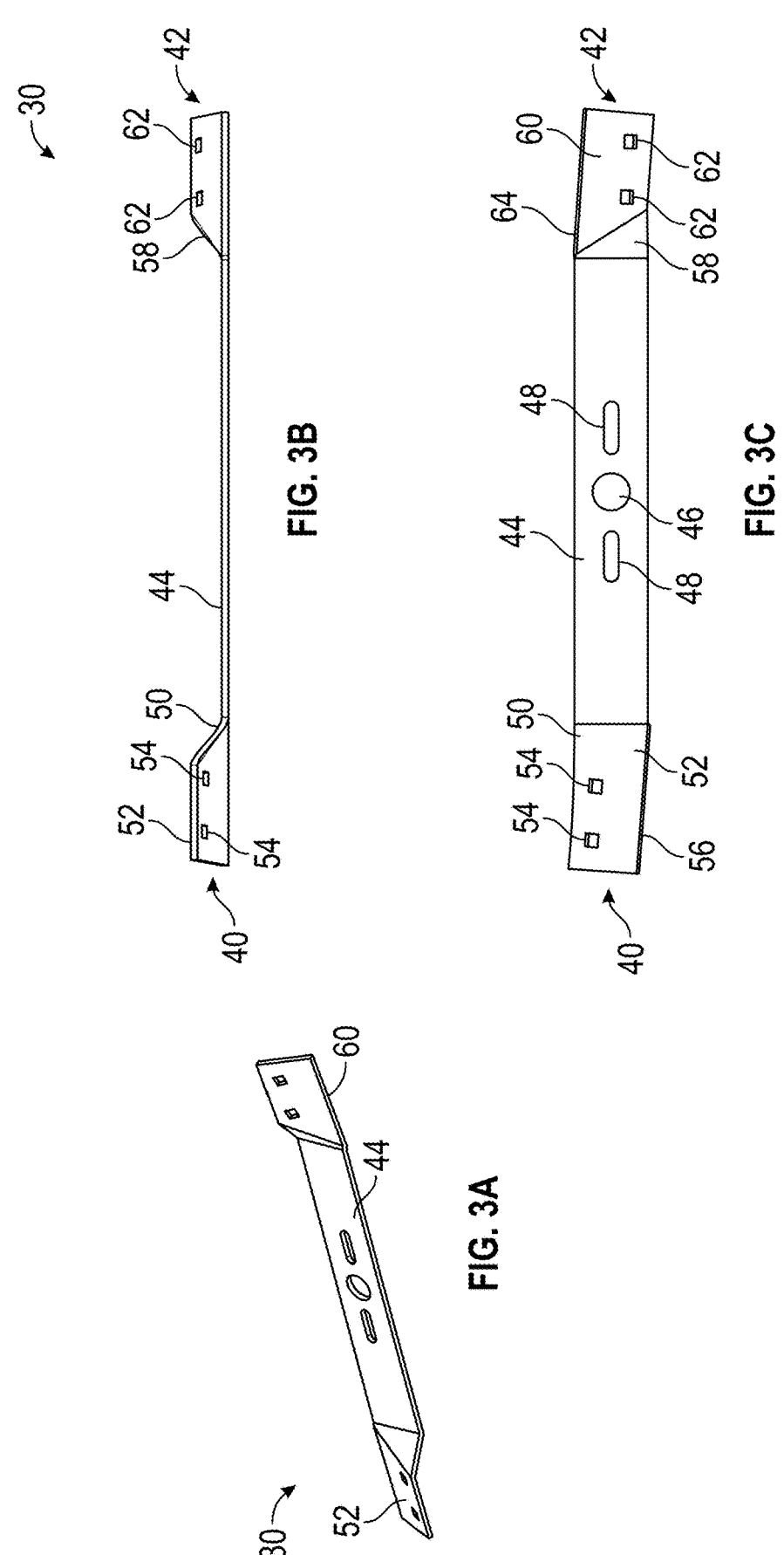
FIG. 3A, FIG. 3B, and FIG. 3C illustrate a perspective view, a side view, and a top view, respectively, of a blade of the blade assembly, in accordance with one embodiment of the present invention.

FIG. 3A, FIG. 3B, and FIG. 3C show perspective, side, and top views, respectively, of blade 30, in accordance with one embodiment of the present invention. Blade 30 has a first end 40 and a second end 42. Blade 30 includes an elongated section 44. Elongated section 44 comes in a rectangular configuration and has a suitable thickness. Elongated section 44 provides the central structural member of blade 30 and establishes the rotational axis for the cutting assembly. Elongated section 44 incorporates mounting features that allow blade 30 to connect to spindle shaft 22 through blade bolt 24, establishing the mechanical coupling necessary for power transfer from the engine system to the cutting components. Elongated section 44 includes a central hole 46 positioned to receive spindle shaft 22 and connect it via blade bolt 24. Central hole 46 may be configured with appropriate dimensions and tolerances to ensure proper alignment and secure attachment to the drive system. Elongated section 44 further includes sectional holes 48 positioned at both sides of central hole 46.

Blade 30 includes a first slant section 50 extending from elongated section 44 toward first end 40. First slant section 50 provides a transitional geometry that connects elongated section 44 to cutting and mounting components positioned at first end 40. The angular configuration of first slant section 50 may be designed to optimize airflow characteristics and provide structural support for the cutting elements while maintaining balanced weight distribution during rotation. First slant section 50 establishes the geometric foundation that allows the replaceable cutter system to function while providing the aerodynamic characteristics necessary for grass cutting operations. Blade 30 further includes a first extending plate 52 positioned at first end 40 and connected to elongated section 44 through first slant section 50. First extending plate 52 provides a mounting surface for attachment of a cutter 32 of plurality of cutters 32. The configuration of first extending plate 52 may be designed to provide multiple attachment points and distribute mechanical loads during high-speed rotation and cutting operations. First extending plate 52 includes first connecting holes 54 that receive fasteners 34 and bolts 36 for securing cutter 32 to blade 30. First connecting holes 54 may be positioned and sized to provide secure attachment while allowing for repeated removal and installation of cutters 32 during maintenance procedures. As shown in FIG. 3C, first extending plate 52 includes a first cutting edge 56 that is used to cut grass.

First cutting edge 56 may be configured to work in conjunction with cutters 32 to provide comprehensive grass cutting performance across the width of the cutting path. The geometry and positioning of first cutting edge 56 may be designed to complement the cutting action of cutters 32 while providing backup cutting capability in areas where the replaceable cutting elements may not provide complete coverage.

With continues reference to FIG. 3A, FIG. 3B, and FIG. 3C, blade 30 includes a second slant section 58 extending from elongated section 44 toward second end 42. Second slant section 58 provides structural and aerodynamic characteristics similar to first slant section 50, establishing balanced geometry across the length of blade 30. The configuration of second slant section 58 may mirror the angular characteristics of first slant section 50 to provide symmetrical airflow patterns and weight distribution during rotation. Second slant section 58 connects elongated section 44 to cutting and mounting components positioned at second end 42, providing the structural foundation for the replaceable cutter system at the opposite end of blade 30.

Blade 30 further includes a second extending plate 60 positioned at second end 42 and connected to elongated section 44 through second slant section 58. Second extending plate 60 provides mounting surfaces and cutting capabilities similar to first extending plate 52, establishing a symmetrical configuration that allows for balanced cutting performance across the width of the mowing path. Second extending plate 60 includes second connecting holes 62 that receive fasteners 34 and bolts 36 for securing cutters 32 to blade 30 at second end 42. Second connecting holes 62 may be configured with dimensions and positioning that correspond to first connecting holes 54, allowing for standardized attachment hardware and simplified maintenance procedures. As further shown in FIG. 3C, second extending plate 60 includes a second cutting edge 64 that provides cutting capability similar to first cutting edge 56.

It should be understood that the structure of blade 30 can be configured to accommodate different blade types including standard, low lift, high lift, and mulching blade configurations. In some cases, the geometry of first slant section 50 and second slant section 58 is modified to provide different airflow characteristics corresponding to the specific blade type requirements. Standard blade configurations may utilize moderate slant angles that provide balanced cutting and airflow performance for general grass cutting applications. Low lift configurations may incorporate reduced slant angles that minimize grass lifting for applications where debris discharge control may be desired. High lift configurations may utilize increased slant angles that enhance grass lifting and discharge velocity for applications requiring improved grass collection or discharge performance. Mulching blade configurations may incorporate specialized geometry in first slant section 50 and second slant section 58 that creates turbulent airflow patterns for enhanced grass cutting and recirculation within the mower deck 20.

Second cutting edge 64 may work in conjunction with cutters 32 attached to second extending plate 60 to provide comprehensive grass cutting performance.

Figure 4A:
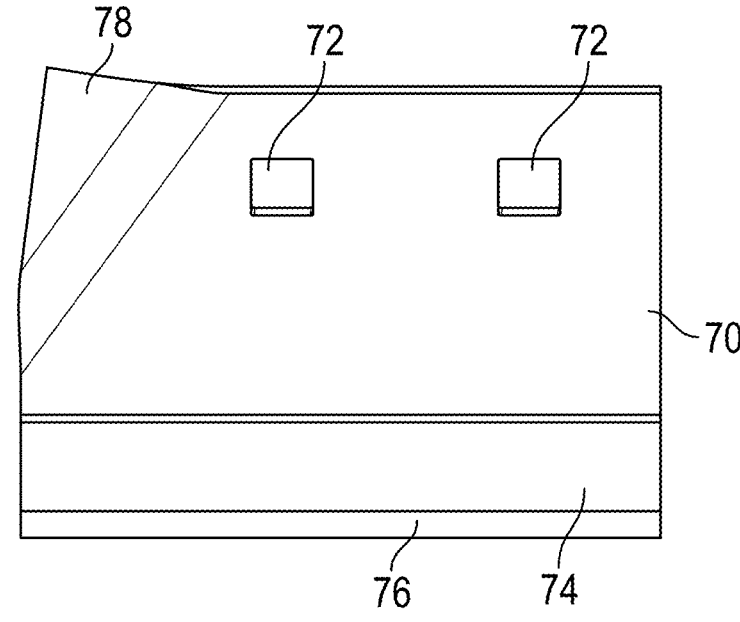
FIG. 4A and FIG. 4B illustrate a top view, and a side view, respectively of a cutter, in accordance with one embodiment of the present invention.
Figure 4B:
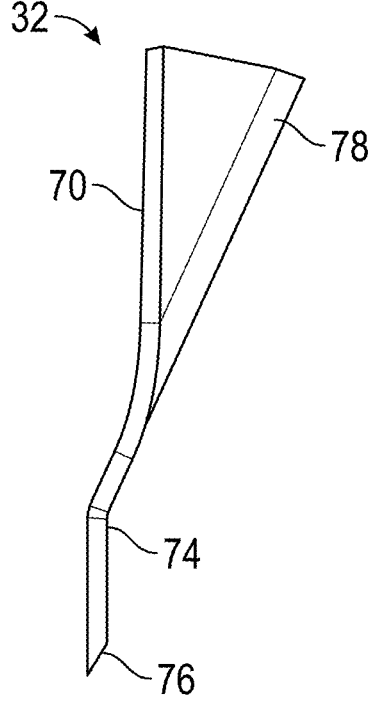

FIG. 4A and FIG. 4B show top and side views of cutter 32, in accordance with one embodiment of the present invention. Cutter 32 includes an interfacing section 70 that provides the mounting interface between cutter 32 and blade 30. The interfacing section 70 may be configured with a flat or planar geometry that allows for direct contact and alignment with first extending plate 52 or second extending plate 60 during assembly procedures. The interfacing section 70 may be constructed from durable materials such as hardened steel or tool steel that provide wear resistance and maintain dimensional stability during repeated attachment and removal cycles. The interfacing section 70 establishes the mechanical foundation that allows cutter 32 to be securely attached to blade 30.

The interfacing section 70 includes cutter connecting holes 72 that align with first connecting holes 54 or second connecting holes 62 of blade 30 during assembly. Cutter connecting holes 72 are positioned and dimensioned to receive fasteners 34 and bolts 36, establishing the mechanical attachment between cutter 32 and blade 30. Cutter connecting holes 72 are configured with appropriate tolerances and surface finishes that allow for repeated assembly and disassembly without degradation of the attachment interface. The positioning of the cutter connecting holes 72 within the interfacing section 70 are designed to distribute mechanical loads evenly across the attachment interface, reducing stress concentrations that could lead to premature failure during high-speed rotation.

Cutter 32 further includes a cutter raised section 74 that extends from the interfacing section 70. Cutter raised section 74 is angled relative to the interfacing section 70, creating a three-dimensional cutting profile that enhances grass engagement and cutting performance. Cutter raised section 74 is configured with appropriate thickness and cross-sectional geometry that provides structural integrity while maintaining sharp cutting characteristics. In some cases, cutter raised section 74 is heat-treated or hardened to provide enhanced wear resistance and maintain cutting sharpness during extended use periods. The geometry of the cutter raised section 74 is designed to complement the airflow patterns created by blade 30 during rotation, contributing to grass lifting and positioning for optimal cutting performance.

In some cases, cutter raised section 74 includes a cutter cutting edge 76. Cutter cutting edge 76 can be used to cut grass. Cutter cutting edge 76 is configured with a sharp geometry that allows for clean cutting of grass blades without tearing or shredding the vegetation. Cutter cutting edge 76 is positioned along the leading edge of cutter raised section 74 relative to the direction of rotation during operation. In some cases, cutter cutting edge 76 is configured as mulching cutters with piranha-style cutting elements for enhanced grass cutting performance. The piranha-style configuration may incorporate multiple cutting points or serrated features along cutter cutting edge 76 that provide aggressive cutting action and improved grass processing capabilities. Cutter cutting edge 76 may be sharpened and reused multiple times rather than being replaced, extending the operational life of the cutting elements and reducing maintenance costs for users.

Cutter 32 further includes a cutter slant section 78. Cutter slant section 78 is configured with an angular profile that creates a smooth transition from the mounting interface. In some cases, cutter slant section 78 may be angled at approximately 53 degrees with respect to the flat interfacing section 70. This angular configuration provides a specific geometric relationship that may optimize the transition between the mounting interface and the raised cutting section. The 53-degree angle may be selected to provide balanced structural support while maintaining appropriate clearance for grass flow and cutting operations. This angular relationship allows cutter slant section 78 to create a smooth transition that distributes mechanical stresses evenly across the cutter 32 structure during high-speed rotation.

The angular configuration of cutter slant section 78 may be adjusted to accommodate different blade configurations and operational requirements. In some cases, the angle of cutter slant section 78 may vary between 30 to 65 degrees depending on the specific geometry of first slant section 50 or second slant section 58 at one or both ends of blade 30. This angular range allows cutter slant section 78 to be optimized for different blade types and cutting applications while maintaining proper interface characteristics with the corresponding blade slant sections. The overlap distance between cutter cutting edge 76 and first cutting edge 56 or second cutting edge 64 may be configured at approximately 0.5 to 1.5 inches, providing coordinated cutting coverage while preventing interference between cutting elements during rotation. The vertical clearance between cutter raised section 74 and the corresponding extending plate may be maintained at approximately 0.25 to 0.75 inches to ensure adequate grass flow while preventing debris accumulation.

The selection of the specific angle within the 30 to 65 degree range may be determined by the blade configuration requirements and the desired cutting performance characteristics. Lower angles within this range may be utilized when cutter slant section 78 interfaces with blade configurations that incorporate reduced slant angles, such as low lift blade designs. Higher angles within this range may be employed when cutter slant section 78 needs to complement blade configurations with increased slant angles, such as high lift or mulching blade designs. The variable angular configuration allows cutters 32 to be matched to specific blade 30 geometries while maintaining optimal structural support and cutting performance across different mowing applications. The radial clearance between the outermost edge of cutter cutting edge 76 and the inner surface of mower deck 20 may be maintained at approximately 0.5 to 1.0 inches during rotation to prevent contact while allowing adequate cutting performance. The horizontal offset between cutter cutting edge 76 and the corresponding blade cutting edge may be configured at approximately 0.25 to 0.5 inches to provide sequential cutting action while maintaining balanced weight distribution across the rotating assembly.

The angular configuration of cutter slant section 78 is designed to interface and sit above first slant section 50 or second slant section 58. This configuration allows cutters 32 to sit above blade 30 at both first end 40 and second end 42 and present two removable cutters 32. When cutters 32 are placed above first extending plate 52 and second extending plate 60, they are used as additional cutters in addition to blade 30 having first cutting edge 56 and second cutting edge 64, which are traditionally used for cutting grass.

The design of cutter 32 allows the blade assembly 12 to be maintained using a single wrench tool for cutter removal and installation. The standardized configuration of the cutter connecting holes 72 and the attachment hardware may allow users to perform maintenance procedures with minimal tooling requirements, reducing the complexity and time associated with cutter replacement or sharpening operations. The interfacing section 70 may be designed to provide adequate access for wrench engagement while the cutter 32 remains attached to blade 30, allowing for efficient removal and installation procedures. In some cases, the cutter connecting holes 72 may be positioned to allow simultaneous engagement of multiple fasteners 34 or bolts 36 with a single wrench tool, further streamlining the maintenance process and reducing the time required for cutter service procedures.

Figure 5:
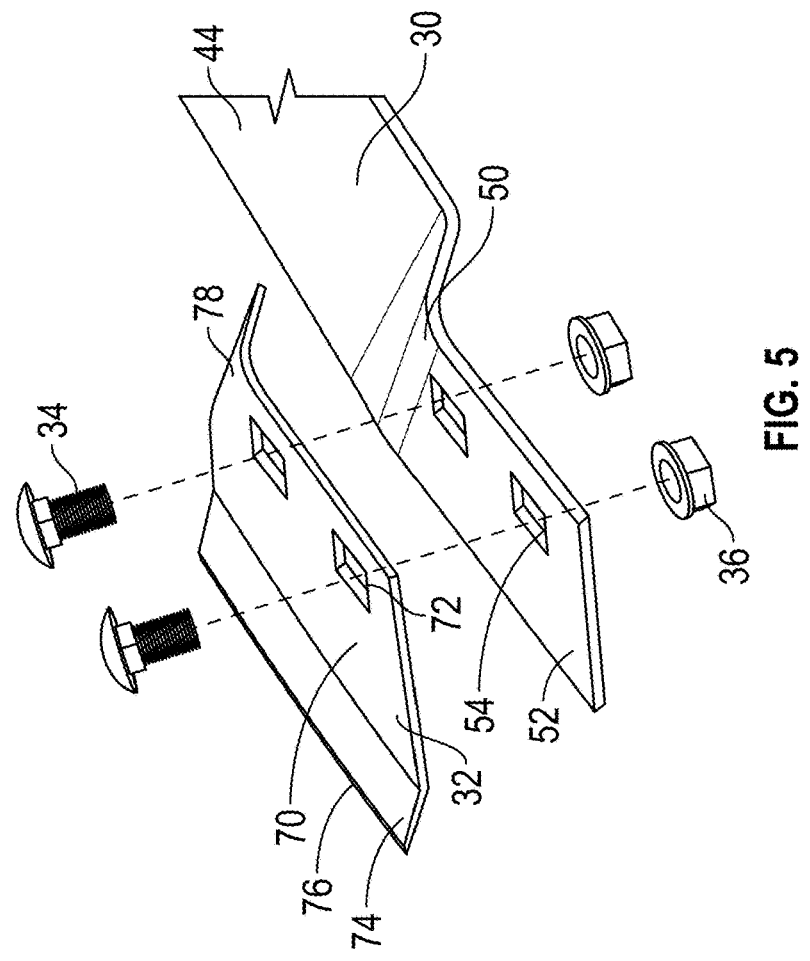
FIG. 5 illustrates the cutter aligned with an extending plate of the blade, in accordance with one embodiment of the present invention.

FIG. 5 shows cutter 32 aligned with first extending plate 52, with fasteners 34 and bolts 36 positioned for connecting the cutter 32 to first extending plate 52, in accordance with one embodiment of the present invention. The alignment process involves positioning cutter 32 such that the interfacing section 70 of cutter 32 comes into direct contact with the mounting surface of first extending plate 52. During this alignment procedure, cutter connecting holes 72 within interfacing section 70 are positioned to correspond precisely with first connecting holes 54 in first extending plate 52. The dimensional tolerances and positioning of these holes may be designed to provide accurate alignment while allowing for manufacturing variations and thermal expansion during operation. The mechanical interface between cutter 32 and first extending plate 52 establishes a secure connection through the coordinated engagement of fasteners 34 and bolts 36 with the aligned hole patterns. Fasteners 34 may be configured as threaded elements that pass through the aligned cutter connecting holes 72 and first connecting holes 54. Bolts 36 work in conjunction with fasteners 34 to provide clamping force that secures cutter 32 against first extending plate 52. The threading engagement between fasteners 34 and bolts 36 is designed with appropriate pitch and thread form to provide secure attachment while allowing for repeated assembly and disassembly cycles during maintenance procedures. The clamping force generated by fasteners 34 and bolts 36 is sufficient to prevent loosening during operation while remaining within the elastic range of the materials to avoid permanent deformation of the attachment interface.

Here, cutter 32 is positioned such that cutter raised section 74 extends beyond the perimeter of first extending plate 52, positioning cutter cutting edge 76 in the optimal location for grass cutting operations. The geometric relationship between cutter 32 and first extending plate 52 is designed to complement the airflow patterns created by first slant section 50 and the overall blade geometry. Cutter slant section 78 may be configured to interface smoothly with first slant section 50, creating a continuous aerodynamic profile that enhances grass lifting and cutting performance. The positioning of cutter 32 relative to first extending plate 52 allows the cutting elements to work in coordination through a sequential cutting mechanism, wherein cutter cutting edge 76 positioned at an elevated height first engages and pre-cuts grass blades as they are lifted by the airflow generated during blade rotation, followed by first cutting edge 56 of first extending plate 52 which provides secondary cutting action at a lower height to ensure complete grass processing. This coordinated operation occurs as the rotating blade assembly creates distinct aerodynamic zones, with cutter cutting edge 76 operating in the high-velocity airflow region approximately 0.25 to 0.75 inches above first extending plate 52, while first cutting edge 56 functions in the primary cutting zone closer to the ground level. The temporal sequence of grass engagement begins when the elevated cutter cutting edge 76 contacts grass vegetation during the initial phase of the cutting cycle, conditioning and partially severing the grass material, which is then immediately processed by first cutting edge 56 as the blade assembly continues its rotational motion, ensuring that any grass material not completely severed by the elevated cutter is definitively cut by the backup cutting capability of the extending plate cutting edge.

The mechanical interface design facilitates easy cutter replacement procedures while maintaining secure attachment during operational conditions. The configuration of cutter connecting holes 72 and first connecting holes 54 allows to remove fasteners 34 and bolts 36 using standard tools, enabling cutter 32 to be separated from first extending plate 52 for sharpening or replacement. The hole patterns may be designed with sufficient clearance to allow wrench access while cutter 32 remains in position, streamlining the maintenance process and reducing the time associated with cutter service procedures. The attachment system may be configured to provide visual or tactile feedback during assembly, allowing users to confirm proper alignment and engagement of the fastening elements. In some cases, the interfacing section 70 may include alignment features such as locating pins or recessed areas that correspond to features on first extending plate 52, providing additional positioning accuracy and preventing misalignment during assembly procedures.

Figure 6:
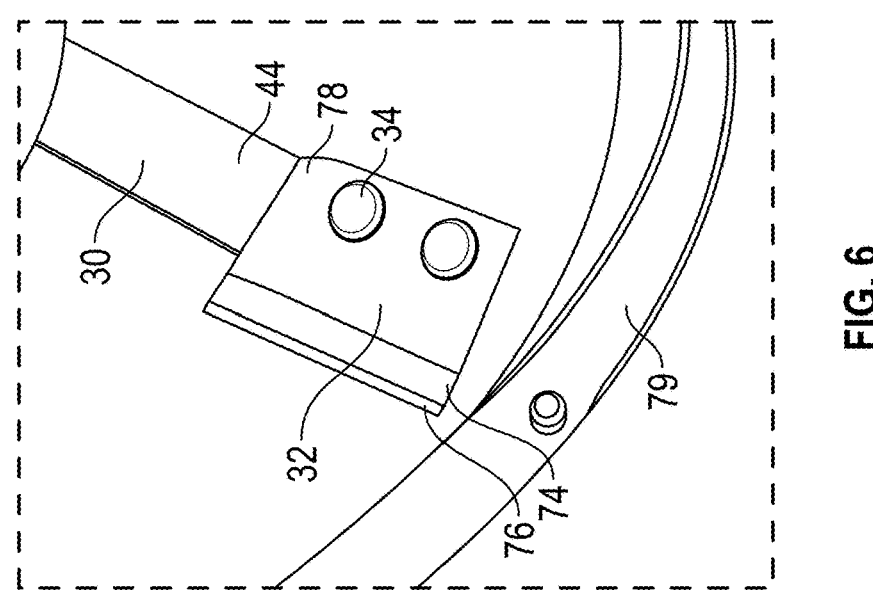
FIG. 6 illustrates the cutter and blade assembled underneath a mower deck, in accordance with one embodiment of the present invention.

FIG. 6 shows the cutter 32 and blade 30 assembled underneath mower deck 20, in accordance with one embodiment of the present invention. Specifically, FIG. 6 shows a frame 79 encompassing blade assembly 12. Here, mower deck 20 is lifted to show the arrangement of blade assembly 12.

Figures 7, 8:
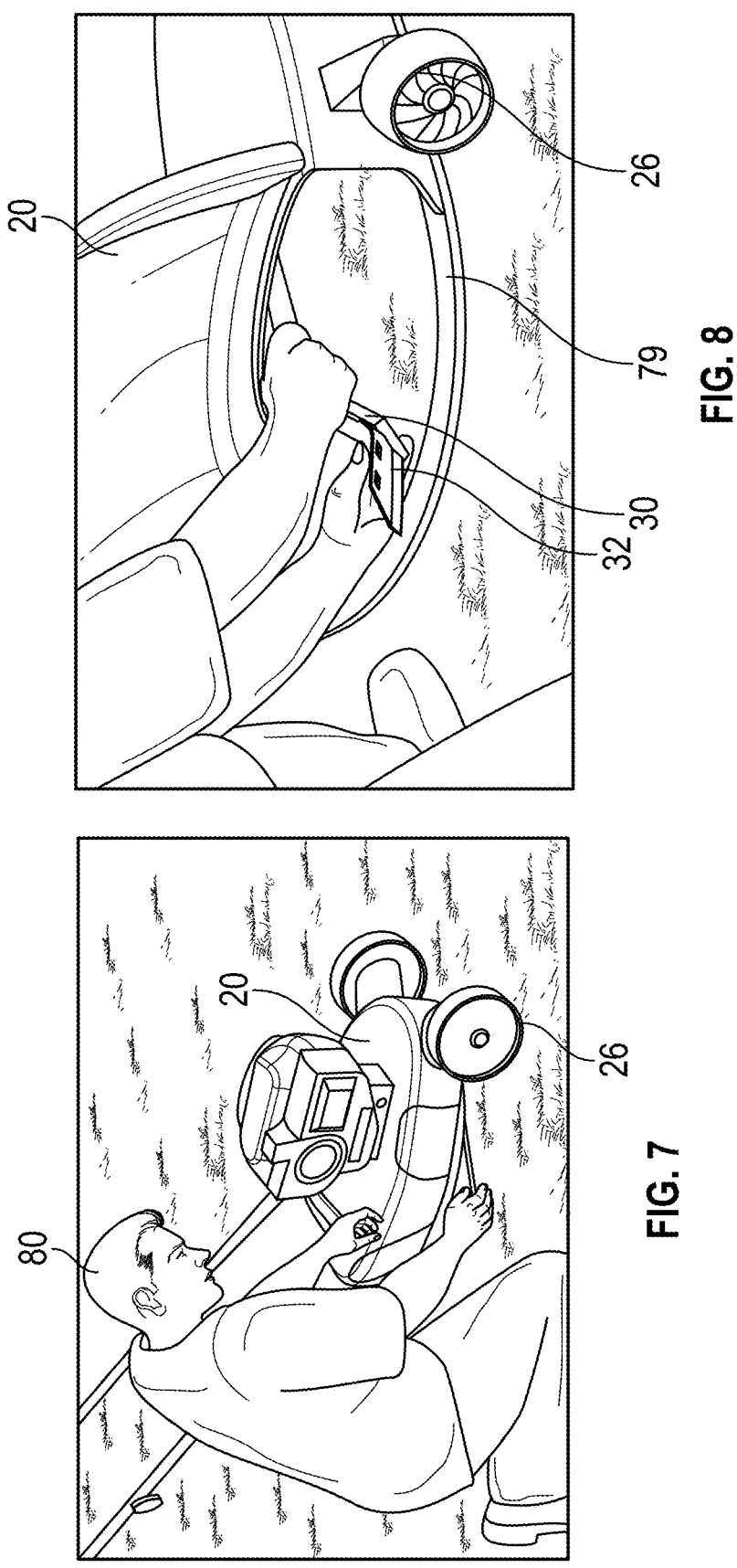
FIG. 7 illustrates the mower deck of being lifted for maintenance access, in accordance with one embodiment of the present invention.
FIG. 8 illustrates a user removing the cutter from the blade during maintenance, in accordance with one embodiment of the present invention.

FIG. 7 shows a user 80 lifting mower deck 20 to access blade assembly 12 for maintenance procedures, in accordance with one embodiment of the present invention. The maintenance approach depicted allows user 80 to perform blade assembly 12 service while lawn mower 10 remains in a stable position supported by wheels 26. This configuration eliminates the physical strain and safety concerns associated with tilting the entire lawn mower 10 to access the cutting components. User 80 lifts mower deck 20 while maintaining proper body mechanics to avoid injury during the maintenance procedure. Wheels 26 provide stable support for the remainder of lawn mower 10 during the maintenance operation, preventing the equipment from shifting or becoming unstable while the user accesses the blade assembly 12. The design allows maintenance personnel to work in a more ergonomic position compared to conventional blade replacement procedures that require complete equipment tilting or user positioning underneath the mower.

The lifting mechanism shown in FIG. 7 provides access to blade assembly 12 components without requiring specialized lifting equipment or support structures. The configuration allows user 80 to maintain visual contact with the blade assembly 12 components during maintenance procedures, facilitating accurate component alignment and proper reassembly after service operations are completed.

FIG. 8 shows user 80 removing cutter 32 from blade 30 during maintenance procedures, in accordance with one embodiment of the present invention. The removal process demonstrates how cutters 32 may be accessed and serviced while blade 30 remains securely attached to spindle shaft 22 through blade bolt 24, with the blade-to-spindle connection remaining undisturbed throughout the cutter maintenance procedure. This approach eliminates the need to disconnect the entire blade assembly 12 from the drive system, reducing the complexity and time associated with maintenance procedures while maintaining the primary blade attachment to spindle shaft 22 in its operational configuration. User 80 may access the attachment hardware connecting cutter 32 to blade 30 using standard tools while mower deck 20 remains in the lifted position shown in FIG. 7. The cutter removal procedure allows individual cutters 32 to be separated from blade 30 for sharpening or replacement without affecting the attachment of blade 30 to the drive system, ensuring that blade bolt 24 and the connection between blade 30 and spindle shaft 22 remain intact and properly torqued throughout the maintenance operation.

The maintenance procedure shown in FIG. 8 allows user 80 to service cutting components while lawn mower 10 remains supported on wheels 26 in a stable configuration and blade 30 maintains its connection to spindle shaft 22. User 80 may remove fasteners 34 and bolts 36 that secure cutter 32 to blade 30 using appropriate tools while maintaining proper positioning relative to the blade assembly 12. The design of the attachment system allows cutter 32 to be separated from blade 30 without requiring specialized tools or complex disassembly procedures, and importantly, without disturbing the connection between blade 30 and spindle shaft 22. User 80 may perform the removal operation while maintaining visual contact with the attachment hardware, facilitating accurate tool engagement and preventing damage to the fastening elements during service procedures. The maintenance approach depicted allows for efficient cutter service while minimizing the physical demands placed on maintenance personnel compared to conventional blade replacement procedures that require complete equipment manipulation and disconnection of the blade from the spindle shaft.

The maintenance and/or replacement procedures shown in FIG. 7 and FIG. 8 demonstrate how blade assembly 12 design facilitates service operations while maintaining equipment stability and user safety. The approach eliminates the need for user 80 to position underneath lawn mower 10 or to manipulate the entire equipment during maintenance procedures. The lifting of mower deck 20 provides adequate access to blade assembly 12 components while wheels 26 maintain contact with the ground surface, preventing equipment instability during service operations. The cutter removal procedure allows individual cutting elements to be serviced without affecting the primary blade attachment to the drive system, with blade 30 remaining connected to spindle shaft 22 via blade bolt 24 throughout the entire maintenance process, reducing the complexity of reassembly procedures and minimizing the potential for incorrect installation. The maintenance approach may reduce the time associated with blade service operations while improving user safety through elimination of equipment tilting and awkward positioning requirements.

The connection of cutter 32 on top of blade 30 establishes a dual cutting system that enhances grass cutting performance through coordinated operation of multiple cutting elements positioned at different aerodynamic zones. Each cutter 32 is positioned above first extending plate 52 and second extending plate 60, creating an elevated cutting configuration where respective cutter raised section 74 extends beyond the perimeter of the extending plates and operates within the high-velocity airflow region generated by blade rotation. This positioning allows cutter cutting edges 76 to engage grass at a different height and angle compared to first cutting edge 56 and second cutting edge 64 of blade 30, creating distinct aerodynamic lift zones that enhance grass lifting performance with lift coefficients optimized for different grass heights and densities. The elevated positioning of cutters 32 generates increased discharge velocity characteristics, with airflow patterns creating suction effects that draw grass upward into the cutting path before engagement by the primary blade cutting edges. Cutters 32 positioned on both sides of blade 30 work in conjunction to provide comprehensive grass cutting coverage across the width of the mowing path, with each cutter 32 contributing to the overall cutting performance through its angled raised section 74 and associated cutter cutting edge 76 while creating turbulent airflow patterns that enhance mulching capabilities by promoting grass recirculation within the cutting chamber.

The angled configuration of cutter raised section 74 positions cutter cutting edge 76 to engage grass blades during rotation, with the angular geometry providing optimal cutting action as the blade assembly 12 rotates beneath mower deck 20 and generates specific airflow velocity profiles that enhance grass processing efficiency. The cutting action occurs as cutter cutting edge 76 contacts grass vegetation within the high-velocity airflow zone, with the sharp edge geometry providing clean cutting rather than tearing or shredding the grass material while the aerodynamic design creates discharge velocities that facilitate efficient grass clipping evacuation from the cutting chamber. The positioning of cutters 32 above the extending plates allows the cutting edges to work at different elevations and within distinct aerodynamic pressure zones, potentially providing multiple cutting passes as grass enters the cutting chamber and encounters both the traditional blade cutting edges operating in the primary lift zone and the elevated cutter cutting edges functioning in the secondary high-velocity airflow region. This dual-zone cutting system enhances mulching performance by creating multiple grass processing stages, with the elevated cutters providing initial grass conditioning and size reduction before final processing by the primary blade cutting edges, resulting in improved grass clipping uniformity and enhanced decomposition characteristics for lawn health benefits.

During extended use periods, the sharpness of cutters 32 may diminish due to contact with grass, soil particles, and occasional debris encountered during mowing operations.

The wear patterns on cutter cutting edge 76 typically manifest as edge rounding, micro-chipping, or dulling that progresses from the leading edge toward the base of the cutting surface. User 80 may assess the cutting performance and determine when cutter maintenance is required by observing grass cutting quality, noting any tearing or poor cutting characteristics that indicate dulled cutting edges. Visual indicators of wear include visible nicks or chips along cutter cutting edge 76, a rounded appearance of the previously sharp edge geometry, or metallic burnishing that indicates excessive friction during cutting operations. Performance degradation typically begins with slight grass tearing rather than clean cutting, progresses to increased engine load during operation, and may eventually result in grass being pushed down rather than cut effectively. When maintenance is needed, user 80 lifts mower deck 20 as demonstrated in FIG. 7 to access blade assembly 12 components while lawn mower 10 remains supported on wheels 26 in a stable configuration.

The cutter removal process allows user 80 to service individual cutters 32 without affecting the attachment of blade 30 to spindle shaft 22, with the blade remaining securely connected to the drive system throughout the maintenance procedure. Expected service intervals for cutters 32 may range from 25 to 50 hours of operation under normal conditions, with factors such as grass type, soil conditions, debris content, and cutting frequency significantly affecting cutter longevity. Sandy soils and areas with frequent debris contact may reduce service intervals to 15-25 hours, while clean grass cutting in optimal conditions may extend intervals to 75-100 hours of operation. The service intervals mentioned above are exemplary and actual performance may vary based on specific operating conditions, maintenance practices, and environmental factors. Hours of operation may vary significantly depending on grass type, cutting frequency, terrain conditions, and individual usage patterns. In some cases, cutters 32 may require more frequent maintenance in challenging conditions, while other applications may allow for extended service intervals beyond the typical ranges.

User 80 may remove fasteners 34 and bolts 36 that secure cutter 32 to first extending plate 52 or second extending plate 60, allowing the worn cutter 32 to be separated from blade 30 for sharpening procedures while blade 30 remains attached to spindle shaft 22. The removed cutter 32 may be sharpened using conventional blade sharpening equipment or techniques, restoring the cutting edge geometry and sharpness of cutter cutting edge 76. Proper sharpening maintains the original edge angle and removes damaged material while preserving the structural integrity of cutter raised section 74. Following sharpening operations, user 80 may reinstall the serviced cutter 32 by positioning interfacing section 70 against the appropriate extending plate and securing the connection using fasteners 34 and bolts 36 in the reverse of the removal procedure, all while blade 30 maintains its connection to the drive system.

User 80 may remove fasteners 34 and bolts 36 that secure cutter 32 to first extending plate 52 or second extending plate 60, allowing the worn cutter 32 to be separated from blade 30 for sharpening procedures while blade 30 remains connected to spindle shaft 22 via blade bolt 24. The removed cutter 32 may be sharpened using conventional blade sharpening equipment or techniques, restoring the cutting edge geometry and sharpness of cutter cutting edge 76. Proper sharpening maintains the original edge angle and removes damaged material while preserving the structural integrity of cutter raised section 74. Following sharpening operations, user 80 may reinstall the serviced cutter 32 by positioning interfacing section 70 against the appropriate extending plate and securing the connection using fasteners 34 and bolts 36 in the reverse of the removal procedure, with blade 30 remaining attached to the spindle shaft throughout the entire maintenance operation.

In cases where cutters 32 have experienced excessive wear or damage that cannot be addressed through sharpening, user 80 may replace the worn cutters 32 with new cutting cutters 32 while blade 30 remains securely attached to spindle shaft 22. Excessive wear characteristics that indicate replacement necessity include edge material loss exceeding 3-5 millimeters from the original cutting edge profile, crack formation in cutter raised section 74 or cutter slant section 78, or deformation of interfacing section 70 that prevents proper alignment with the extending plates. The relationship between cutting performance degradation and wear characteristics shows that minor edge dulling affects cutting quality first, while structural wear impacts operational safety and attachment integrity. The replacement procedure follows the same removal process, with user 80 discarding the worn cutter 32 and installing a new cutter 32 in its place while the primary blade connection to the drive system remains undisturbed. The standardized configuration of cutter connecting holes 72 and the corresponding holes in the extending plates allows new cutters 32 to be installed using the same fasteners 34 and bolts 36, maintaining compatibility and simplifying the replacement process. Factors affecting cutter longevity include operating speed, grass moisture content, cutting height settings, and maintenance frequency, with proper maintenance potentially extending cutter life through multiple sharpening cycles before replacement becomes necessary.

The positioning of cutters 32 may be adjusted to optimize the coordination between cutter cutting edge 76 and the cutting edges of blade 30. In some cases, the height and angular positioning of cutters 32 may be configured such that both cutter cutting edge 76 and first cutting edge 56 or second cutting edge 64 engage grass simultaneously, creating a dual cutting action that provides enhanced cutting performance. This dual blade configuration on both sides of blade assembly 12 may improve grass cutting efficiency and provide more consistent cutting results across varying grass conditions and heights.

The adjustability of the cutter system allows users to optimize cutting performance based on specific grass types, cutting conditions, and desired cutting characteristics. The dual cutting edges may provide improved grass lifting and cutting action, with the elevated cutter cutting edge 76 potentially engaging grass before the traditional blade cutting edges, pre-conditioning the vegetation for more effective cutting by the primary blade elements.

In some cases, user 80 may choose to operate lawn mower 10 without cutters 32 attached to blade 30, effectively converting blade assembly 12 to a traditional single-blade configuration while blade 30 remains connected to spindle shaft 22. This operational mode may be selected when simplified cutting performance is desired or when cutter maintenance is not practical for specific applications. User 80 may remove both cutters 32 from first extending plate 52 and second extending plate 60, leaving blade 30 to function independently with first cutting edge 56 and second cutting edge 64 providing the grass cutting capability. The removal of cutters 32 does not affect the structural integrity or operational capability of blade 30, allowing the traditional blade cutting edges to perform grass cutting operations in a conventional manner while maintaining the connection to the drive system.

Figure 9:
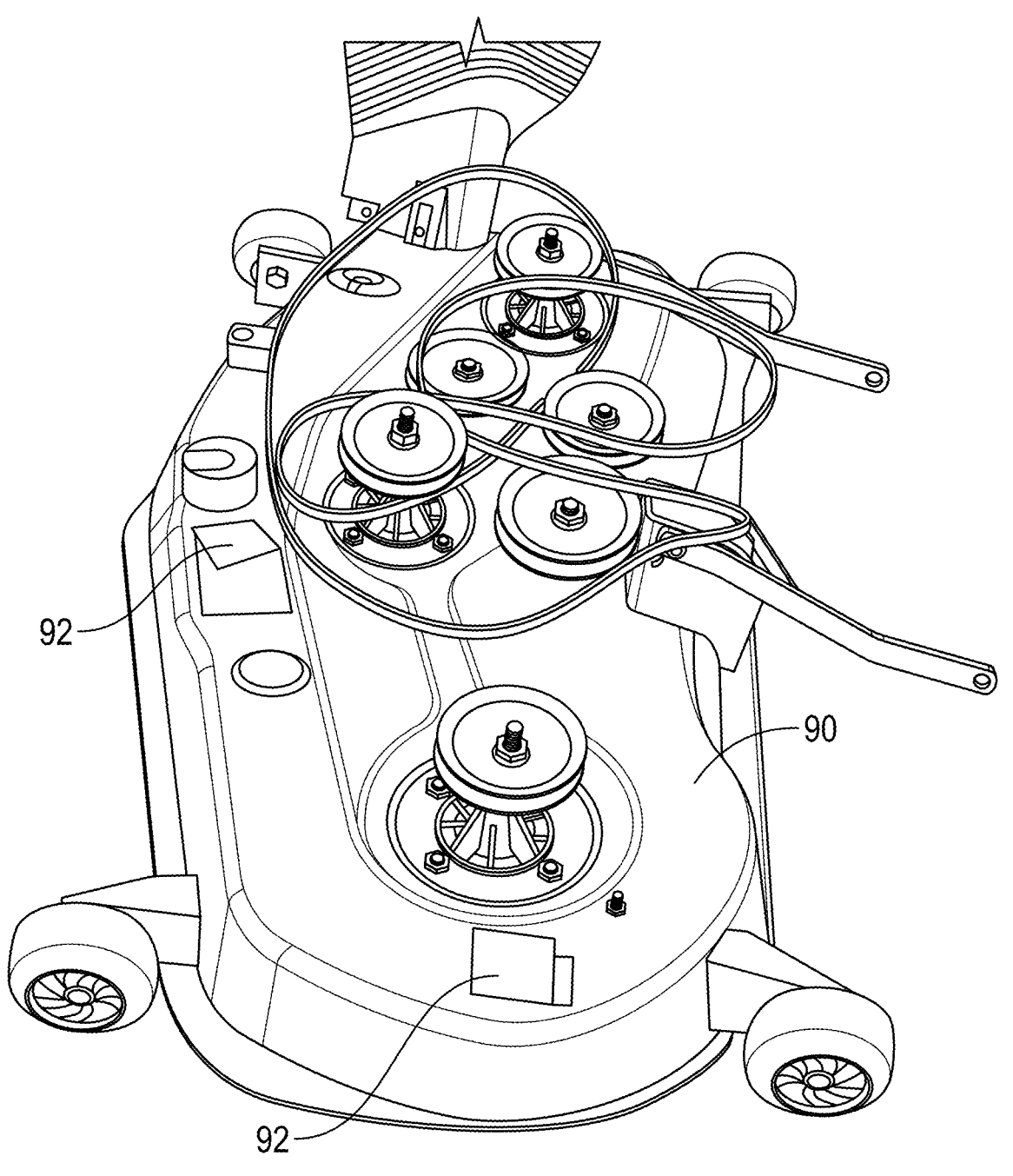
FIG. 9 illustrates a mower deck having access holes for blade assembly maintenance, in accordance with one embodiment of the present invention.

FIG. 9 shows an alternative configuration featuring a mower deck 90 that incorporates access holes 92 for enhanced maintenance accessibility, in accordance with one embodiment of the present invention. Mower deck 90 provides an alternative approach to blade assembly maintenance that eliminates the need for deck lifting procedures shown in FIG. 7 and FIG. 8. Access holes 92 are strategically positioned within mower deck 90 to provide direct access to cutters 32 and blade assembly 12 components during maintenance operations. Access holes 92 may be configured with circular openings having diameters ranging from approximately 3 to 6 inches, providing sufficient clearance for tool access while maintaining structural integrity of mower deck 90. The configuration of mower deck 90 with access holes 92 allows maintenance personnel to perform cutter service procedures while the equipment remains in its normal operational position, further reducing the physical demands and time associated with blade maintenance operations.

Access holes 92 may be positioned at different locations across mower deck 90 to provide optimal maintenance access to various components of blade assembly 12. In some cases, access holes 92 are located near the right end of mower deck 90 to provide access to cutters 32 positioned at one end of blade 30. Additional access holes 92 may be positioned closer to the center front area of mower deck 90 to provide access to cutters 32 located at the opposite end of blade 30 or to central components of blade assembly 12. The strategic positioning of access holes 92 allows user 80 to reach all serviceable components of blade assembly 12 without requiring equipment manipulation or deck removal procedures. The dimensional characteristics of access holes 92 may be designed with edge-to-edge spacing of approximately 2 to 6 inches to provide adequate tool clearance while maintaining structural support across mower deck 90. The positioning of access holes 92 may be located approximately 1 to 4 inches from the outer perimeter of mower deck 90 to optimize access angles while preserving deck rigidity during high-speed blade rotation.

The functionality of access holes 92 includes the capability to be opened for maintenance access to cutters 32 and closed during grass cutting operations. In some cases, access holes 92 incorporate removable covers or closure mechanisms that allow access holes 92 to be sealed during normal mowing operations while providing easy access during maintenance procedures. The closure system for access holes 92 may include threaded covers with O-ring seals that provide weatherproof sealing to ensure secure attachment during operation. Alternative closure mechanisms may include spring-loaded covers with compression seals against the deck surface, preventing debris infiltration while allowing single-handed operation for maintenance access. The covers may be constructed from durable materials such as aluminum or reinforced polymer to provide structural integrity while maintaining lightweight characteristics. The sealing characteristics of the closure system may incorporate rubber gaskets or silicone seals to provide effective sealing against moisture and debris while maintaining flexibility. The covers or closure mechanisms may be configured with quick-release features such as quarter-turn fasteners or cam-lock mechanisms that allow opening and closing in less than 30 seconds without requiring specialized tools or complex manipulation procedures. The sealing characteristics of the closure system may prevent grass clippings, dirt, and moisture from entering the mower deck 90 interior through access holes 92 during operation while maintaining proper airflow characteristics within the cutting chamber.

The blade assembly configuration provides several advantages over conventional lawn mower blade systems and prior art approaches. The replaceable cutters allow the users to service individual cutters without removing the entire blade assembly from the spindle shaft, with the blade remaining attached to the spindle shaft throughout the maintenance procedure, eliminating the physical strain and safety concerns associated with tilting the lawn mower or positioning the users beneath the equipment. This approach may reduce maintenance time and complexity while improving user safety through elimination of awkward positioning requirements and heavy equipment manipulation.

The dual cutting system created by positioning the cutters above the blade may provide enhanced grass cutting performance compared to traditional single-blade configurations. The elevated positioning of the cutter cutting edges relative to the first cutting edge and the second cutting edge allows for multiple cutting passes as grass enters the cutting chamber, potentially improving cutting quality and reducing the likelihood of grass tearing or shredding. The coordinated operation of multiple cutting elements at different heights may provide more consistent cutting results across varying grass conditions and heights. The standardized attachment system using the fasteners and bolts allows the cutters to be serviced using common tools, reducing the specialized equipment requirements associated with conventional blade maintenance procedures. The ability to sharpen and reuse the cutters multiple times may extend the operational life of the cutting elements and reduce replacement costs compared to systems that require complete blade assembly replacement when cutting edges become dull.

The modular design of the blade assembly allows users to operate the lawn mower in different configurations based on specific cutting requirements. The users may choose to operate with both cutters 32 attached for enhanced cutting performance, remove one cutter for asymmetrical cutting applications, or remove both cutters to convert to a traditional single-blade configuration. This flexibility may provide operational versatility that is not available with conventional fixed-blade systems.

The maintenance accessibility provided by the mower deck lifting or access holes in the mower deck allows service procedures to be performed while the lawn mower remains in a stable position supported by the wheels and the blade remains connected to the spindle shaft. This approach may eliminate the need for specialized lifting equipment, ramps, or support structures that may be required for conventional blade maintenance procedures. The improved accessibility may encourage more frequent maintenance, potentially resulting in better cutting performance and extended equipment life.

The replaceable cutter system may reduce waste generation compared to conventional approaches where entire blade assemblies are discarded when only the cutting edges require attention. The ability to replace individual cutters while retaining the functional blade structure may provide environmental benefits through reduced material consumption and waste disposal requirements.

A person skilled in the art appreciates that the lawn mower blade assembly can come in a variety of shapes and sizes depending on the need and comfort of the user. Further, many changes in the design and placement of components may take place without deviating from the scope of the presently disclosed lawn mower blade assembly.

In the above description, numerous specific details are set forth such as examples of some embodiments, specific components, devices, methods, in order to provide a thorough understanding of embodiments of the present invention. It will be apparent to a person of ordinary skill in the art that these specific details need not be employed, and should not be construed to limit the scope of the invention.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. It is contemplated that additional embodiments are within the spirit and true scope of the disclosed invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A lawn mower blade assembly, comprising:

a blade comprising an elongated section with a central hole configured to receive a spindle shaft;

a first slant section extending from said elongated section toward a first end;

a second slant section extending from said elongated section toward a second end;

a first extending plate connected to said elongated section through said first slant section and positioned at said first end;

a second extending plate connected to said elongated section through said second slant section and positioned at said second end, wherein said first extending plate comprises first connecting holes and a first cutting edge, and said second extending plate comprises second connecting holes and a second cutting edge;

a pair of cutters, each cutter comprising an interfacing section having cutter connecting holes configured to align with said first connecting holes or said second connecting holes, a cutter raised section extending from said interfacing section, a cutter cutting edge positioned on said cutter raised section, and a cutter slant section transitioning between said interfacing section and said elongated section; and a plurality of fasteners configured to removably secure said cutters to said first extending plate and said second extending plate through said aligned holes, wherein said cutters are positioned above said first extending plate and said second extending plate when attached.

2. The lawn mower blade assembly of claim 1, wherein said elongated section further comprises sectional holes positioned on both sides of said central hole.

3. The lawn mower blade assembly of claim 1, wherein said cutter raised section is angled relative to said interfacing section to create a three-dimensional cutting profile.

4. The lawn mower blade assembly of claim 3, wherein said cutter cutting edge is positioned along a leading edge of said cutter raised section relative to a direction of rotation during operation.

5. The lawn mower blade assembly of claim 1, wherein said cutter slant section is configured to sit above said first slant section or said second slant section when said respective cutter is attached to said first extending plate or said second extending plate.

6. The lawn mower blade assembly of claim 1, wherein said cutter cutting edge of each cutter is positioned to operate in coordination with said first cutting edge or said second cutting edge of said respective extending plate.

7. The lawn mower blade assembly of claim 1, wherein said fasteners comprise bolts and nuts.

8. The lawn mower blade assembly of claim 1, wherein said cutter slant section is angled between 30 to 65 degrees relative to said interfacing section.

9. A method of providing a lawn mower blade assembly, said method comprising the steps of:

providing a blade comprising an elongated section with a central hole configured to receive a spindle shaft;

providing a first slant section extending from said elongated section toward a first end;

providing a second slant section extending from said elongated section toward a second end;

providing a first extending plate connected to said elongated section through said first slant section and positioned at said first end;

providing a second extending plate connected to said elongated section through said second slant section and positioned at said second end, said first extending plate comprising first connecting holes and a first cutting edge, and said second extending plate comprising second connecting holes and a second cutting edge;

providing a plurality of cutters, each cutter comprising an interfacing section having cutter connecting holes configured to align with said first connecting holes or said second connecting holes, a cutter raised section extending from said interfacing section and comprising a cutter cutting edge that is positioned on said cutter raised section, and a cutter slant section transitioning between said interfacing section and said elongated section; and removably connecting said cutters to said first extending plate and said second extending plate using fasteners that pass through said cutter connecting holes and said first and second connecting holes, such that said cutters are positioned above said first extending plate and said second extending plate when attached and said connecting holes.

\*    \*    \*    \*    \*